US012609521B2

(12) United States Patent
Deshayes

(10) Patent No.: US 12,609,521 B2
(45) Date of Patent: Apr. 21, 2026

(54) DEVICE FOR THE ELECTRICAL PROTECTION OF POWER SUPPLY CABLES FOR PERMANENT-MAGNET MOTORS

(71) Applicant: SAFRAN ELECTRICAL & POWER, Blagnac (FR)

(72) Inventor: Olivier Deshayes, Moissy-Cramayel (FR)

(73) Assignee: SAFRAN ELECTRICAL & POWER, Blagnac (FR)

( * ) Notice: Subject to any disclaimer, the term of this patent is extended or adjusted under 35 U.S.C. 154(b) by 0 days.

(21) Appl. No.: 18/998,648

(22) PCT Filed: Jul. 20, 2023

(86) PCT No.: PCT/FR2023/051133
§ 371 (c)(1),
(2) Date: Jan. 27, 2025

(87) PCT Pub. No.: WO2024/023426
PCT Pub. Date: Feb. 1, 2024

(65) Prior Publication Data
US 2025/0260221 A1      Aug. 14, 2025

(30) Foreign Application Priority Data
Jul. 27, 2022      (FR) ..................................... 2207719

(51) Int. Cl.
*H02H 1/00*          (2006.01)
*H02H 7/09*          (2006.01)
(Continued)

(52) U.S. Cl.
CPC ............ *H02H 1/0015* (2013.01); *H02H 7/09* (2013.01); *H02H 7/18* (2013.01); *H02H 9/041* (2013.01)

(58) Field of Classification Search
CPC .......... H02H 3/08; H02H 1/0007; H02H 3/10; H02H 9/02; H02H 1/0015; H02H 7/09; H02H 7/18; H02H 9/041
(Continued)

(56) References Cited

U.S. PATENT DOCUMENTS 5,969,928 A * 10/1999 Hashimoto ............ H02H 9/026
                                                361/58
2001/0029433 A1* 10/2001 Scott .................. G01R 31/1272
                                                702/58
(Continued)

FOREIGN PATENT DOCUMENTS

CN          103997022 A      8/2014
CN          207835041 U      9/2018
(Continued)

OTHER PUBLICATIONS

Search Report and Written Opinion issued in International Application No. PCT/FR2023/051133, mailed Nov. 17, 2023.

*Primary Examiner* — Danny Nguyen
(74) *Attorney, Agent, or Firm* — Bookoff McAndrews, PLLC

(57)          ABSTRACT

A device for protecting against a short-circuit occurring on a high-voltage DC power supply line between a DC source and an active load, the device including a bypass circuit formed of a contactor K3 and a fuse F2 connected in series and set up parallel to the active load via a line independent of the high-voltage DC power supply line, the bypass circuit being configured such that most of the current passes through it once the fuse F2 has melted.

7 Claims, 3 Drawing Sheets

(51) Int. Cl.
    *H02H 7/18*           (2006.01)
    *H02H 9/04*           (2006.01)

(58) Field of Classification Search
    USPC ........................................................ 361/2–13
    See application file for complete search history.

(56)             References Cited

U.S. PATENT DOCUMENTS

| | | | |
|---|---|---|---|
| 2012/0122477 A1* | 5/2012 | Sadek ................... | H04W 16/14 |
| | | | 455/456.1 |
| 2012/0133477 A1* | 5/2012 | West ...................... | H01H 85/46 |
| | | | 337/4 |
| 2014/0233136 A1* | 8/2014 | Heerdt ................... | H02H 9/042 |
| | | | 361/2 |
| 2014/0239713 A1* | 8/2014 | Kanzaki ............... | H02H 11/003 |
| | | | 307/11 |
| 2015/0236498 A1 | 8/2015 | Davidson et al. | |
| 2022/0255335 A1* | 8/2022 | Khozikov ............. | H02J 7/0013 |
| 2023/0030964 A1* | 2/2023 | Horinouchi ............. | B60R 16/03 |
| 2025/0038521 A1* | 1/2025 | Piques .................. | B60R 16/033 |

FOREIGN PATENT DOCUMENTS

| | | |
|---|---|---|
| CN | 114257156 A | 3/2022 |
| DE | 202012006940 U1 | 8/2012 |
| EP | 1505706 A2 | 2/2005 |
| WO | 2021210124 A1 | 10/2021 |

\* cited by examiner

[Fig. 1]
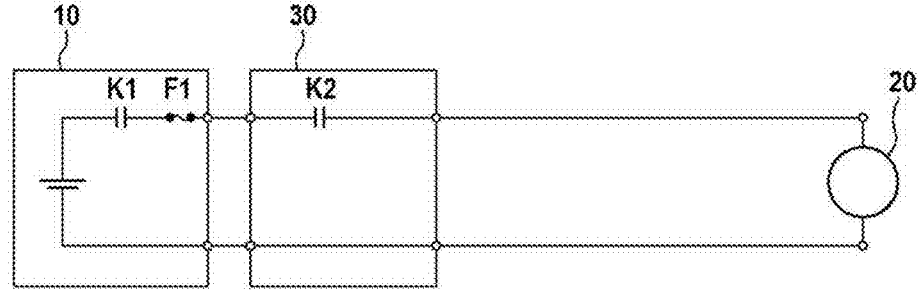
[Fig. 2]
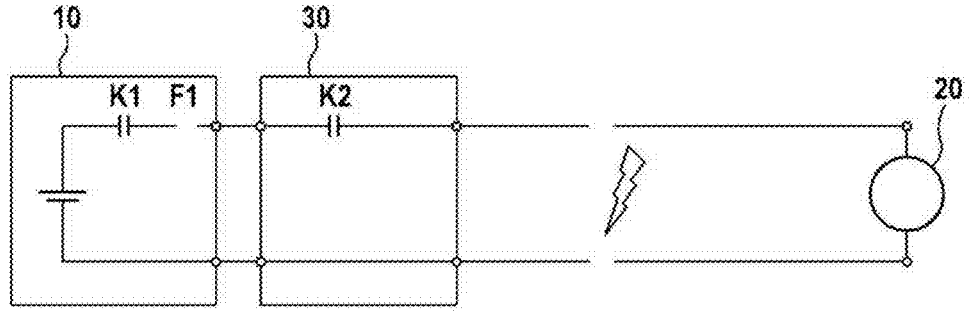
[Fig. 3]
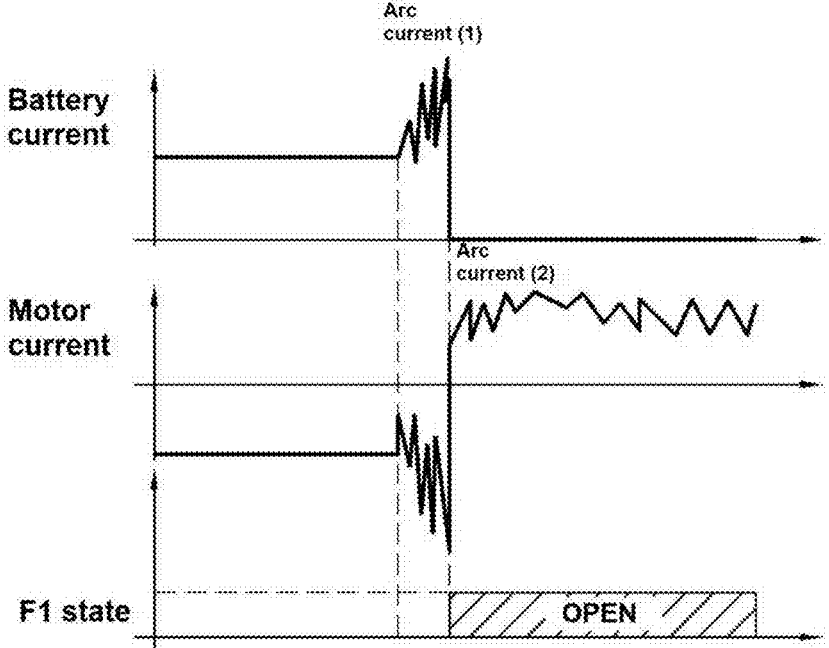

[Fig. 4]
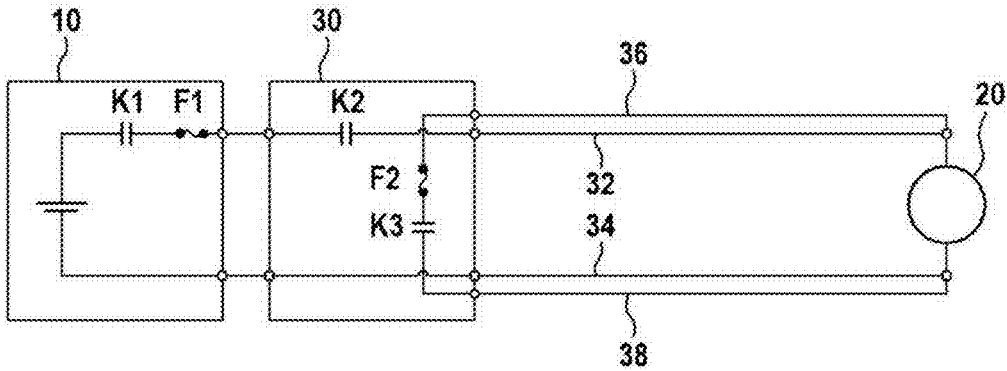
[Fig. 5]
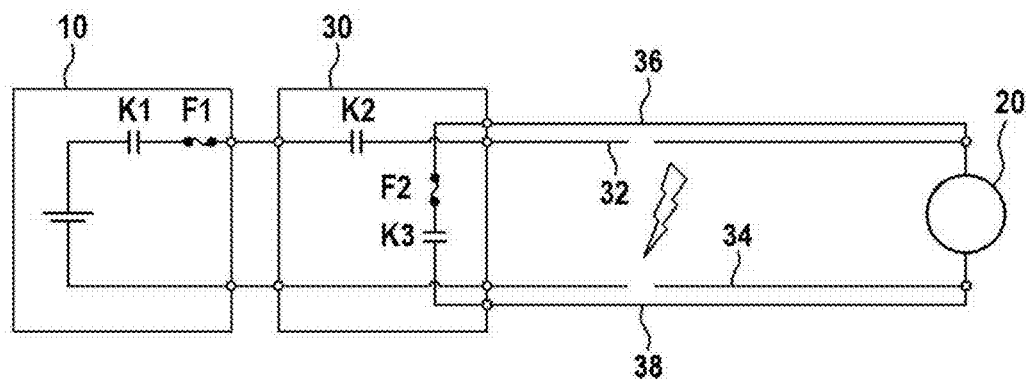
[Fig. 6]
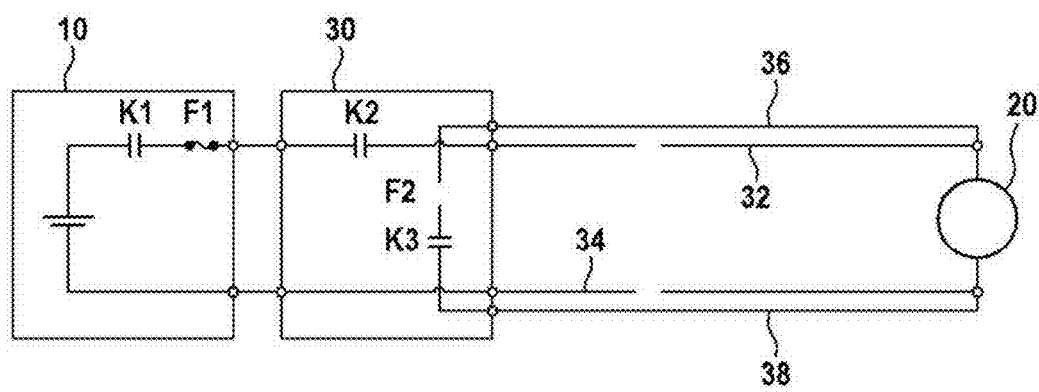

[Fig. 7]
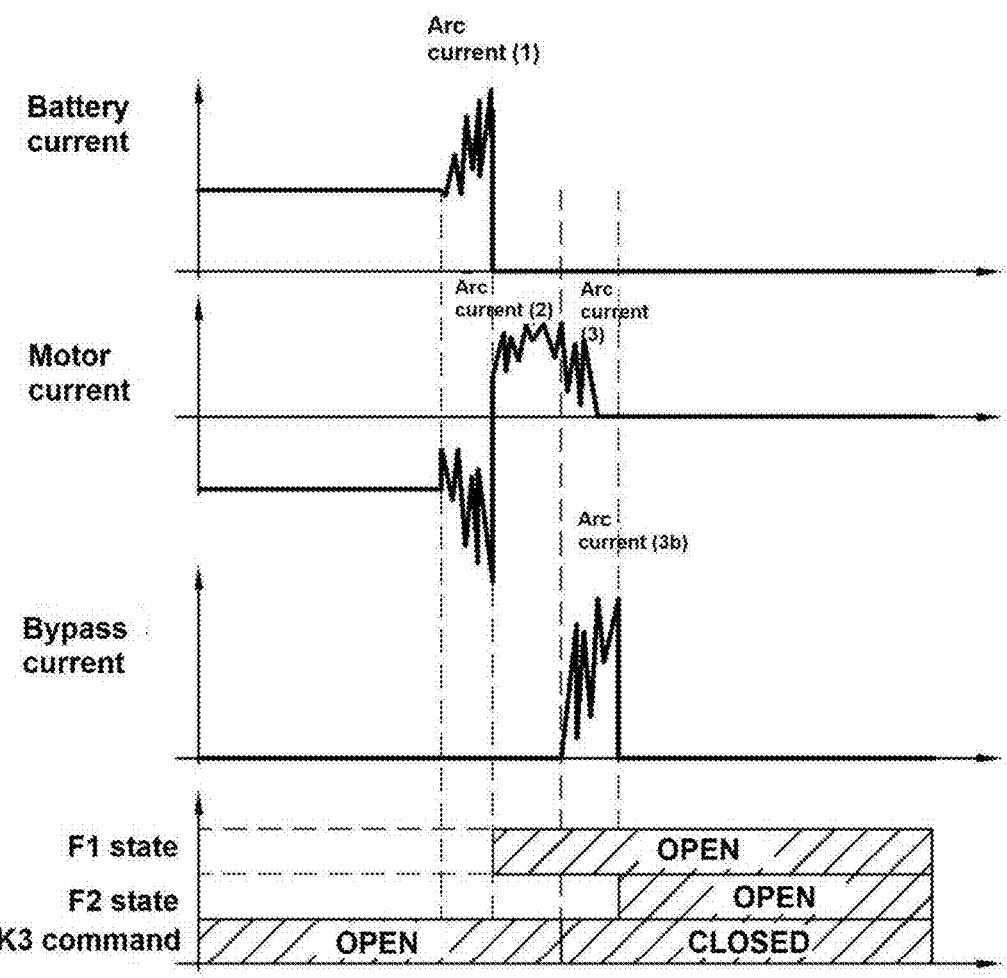

DEVICE FOR THE ELECTRICAL PROTECTION OF POWER SUPPLY CABLES FOR PERMANENT-MAGNET MOTORS

CROSS-REFERENCE TO RELATED APPLICATIONS

This is a National Stage Application under 35 U.S.C. § 371 of International Application No. PCT/FR2023/051133, filed Jul. 20, 2023, now published as WO 2024/023426 A1, which claims priority to French Patent Application No. 2207719, filed on Jul. 27, 2022, the entireties of which are incorporated herein by reference.

TECHNICAL FIELD

This invention relates to the field of electrical propulsion of aircraft and more specifically relates to an electrical protection device for power supply cables of permanent-magnet motors. This device also has an application in hybrid platforms where, to ensure the propulsion of the aircraft, the electrical drive system complements a thermal drive system.

PRIOR ART

All-electrical propulsion systems use an entirely electrical propulsion line composed of an electrical energy source (in general batteries) and one or more electrical loads (in general electric machines) which, to minimize the mass, are often permanent-magnet motors.

Similarly, electrical distribution systems have incorporated electrical protections to protect the electrical installation (wiring, connectors) and which are designed to react so that the electrical energy source supplying a short circuit is disconnected.

Moreover, the electrical loads must be designed to never regenerate current into the network to guarantee the stability of this network and, if they are of a kind that regenerates (permanent-magnet motor or actuator for example), the energy must be dissipated either in the motor or the actuator, or in a dedicated resistive device.

This restriction entails either an over dimensioning of the load to manage the regeneration energy (with, in the long term, a risk of destruction of the system if the aerodynamic effect of the propeller driving the motor is too high) or an additional equipment item including an energy-dissipating resistance which manifests as an increase in mass and volume, which is particularly penalizing.

FIG. 1 schematically illustrates an electrical distribution architecture in the scenario of electrical propulsion of small platforms of VTOL (vertical take-off and landing) type for example.

It consists of a battery 10 supplying power to an electric motor 20 through an electrical distribution box 30. The battery 10 contains its own protection elements, generally with a power contactor K1 to galvanically isolate the cells of the battery and allow maintenance operations and a power fuse F1 which melts in the event of a short circuit being created in the electrical circuit externally to the battery 10. The electrical distribution box 30 generally includes its own power contactor K2.

In the event of a short circuit on the line between the motor 20 and the electrical distribution box 30, for example due to a damaged cable, an electric arc supplied by the current mainly provided by the battery will be created (arc current 1), melting the fuse F1 and, under the effect of the violence of the phenomenon, damage the cable which tends to break (see FIG. 2).

As shown in FIG. 3 illustrating the battery and motor currents according to the state of the fuse F1, if, when the fuse breaks, the motor is driven by its own inertia or by the effect of the aerodynamic forces exerted on its propeller, the motor becomes generative and will supply the short circuit with the arc current (arc current 2). Nothing in the electric circuit then makes it possible to stop the electric arc which is sustained as long as the motor is running and until the level of damage is such that there is no more metallic material to maintain the plasma of the electric arc (this period being able to last for several seconds).

Thus, in an electrical system supplying power to a rotary machine for electrical or hybrid propulsion systems, there is a requirement for a dedicated protection device which can extinguish the electric arc by eliminating the current allowing it to be sustained.

SUMMARY OF THE INVENTION

This main aim of the invention is a device protecting an electrical distribution network with an active load of permanent-magnet rotary machine type by bypassing a fault current. Another aim is to avoid overuse of the electric motor or its associated control electronics. Yet another aim is to avoid the requirement of installation of large, heavy components in the high-voltage DC (HVDC) electrical distribution network on the load side.

These aims are achieved by a device for protecting against a short-circuit occurring on a high-voltage DC power supply line between a DC source and an active load, characterized in that it consists of a bypass circuit formed of a contactor K3 and a fuse F2 connected in series and set up parallel to the active load via a line independent of the high-voltage DC power supply line, the bypass circuit being configured such that most of the current passes through it once the fuse F2 has melted.

Thus, the use of an independent bypass circuit without any resistive load allows for a simple embodiment with few components and which is not very penalizing in mass and volume.

Preferably, the fuse F2 is of low rating (less than 32 A) and the independent line is of small cross-section (less than 6 mm$^2$).

Advantageously, the DC source is a battery and the active load a permanent-magnet electric motor.

Preferably, the contactor K3 and the fuse F2 are assembled in an electrical distribution box disposed between the battery and the permanent-magnet electric motor.

The invention also relates to an electrical distribution network comprising a protection device as mentioned above and an aircraft equipped with such an electrical distribution network.

BRIEF DESCRIPTION OF THE DRAWINGS

Other features and advantages of this invention will become apparent from the description given below, with reference to the appended drawings which illustrate an exemplary embodiment thereof devoid of any limitation and on which:

FIG. 1 schematically illustrates a circuit for supplying power to an electric motor from a battery, FIG. 2 illustrates the circuit of FIG. 1 following an electrical fault on the power supply cables of the electric motor, FIG. 3 shows the creation of an electric arc current between the power supply cables following the electrical fault, FIG. 4 shows a protection device including a bypass circuit of lower impedance in accordance with the invention, FIG. 5 shows the creation of the electric arc current and its extinction of the electric arc in the circuit, FIG. 6 shows the gradual disappearance of the fault by opening of the bypass circuit, and FIG. 7 illustrates the command sequence of the contactor K3 of the bypass circuit during the creation and extinction of the electrical fault.

DESCRIPTION OF THE EMBODIMENTS

The principle of the invention is based on the addition of a bypass circuit of the electric arc current configured to limit regeneration current of a kind that supplies the short-circuit and thus to extinguish this electric arc as quickly as possible.

FIG. 4 illustrates the architecture thus obtained. The battery 10 is shown supplying power to the electric motor 20 through the electrical distribution box 30. The battery 10 incorporates the power contactor K1 and the power fuse F1 and the electrical distribution box 30 includes its own protection element, the power contactor K2. The two high-voltage DC power supply lines (−HVDC and +HVDC) between the motor 20 and the electrical distribution box 30 bear the references 32 and 34. In electrical propulsion, these two power supply lines have voltages typically between 270 VDC and 540 VDC or more.

In accordance with the invention, the electrical distribution box 30 further includes, an assembly formed in series of a contactor K3 and a fuse F2, both of low rating (i.e. an amperage of less than 32 A), and set up in parallel with the motor 20 via an independent line consisting of two cables of small cross-section (typically less than 6 mm²) 36 and 38, the assembly forming a bypass circuit of the electric arc current of lower impedance than the plasma of the electric arc.

By installing these cutoff elements in the electrical distribution box to bypass and control the short circuit energy with components of small size and mass, since they are dimensioned solely for this function, the increase in volume or mass is kept to a minimum.

With this configuration and as shown in FIG. 5, when the short circuit is detected and the voltage has disappeared downstream of the contactor K2, the contactor K3 is commanded to close to draw off a part of the regeneration energy of the motor. Given that the electric arc needs a certain level of energy to be sustained (air ionization energy), it is easy for those skilled in the art to dimension the contactor K3 and the fuse F2 to match exactly what is needed to allow the extinction of the electric arc, the bypass circuit being designed such that most of the current passes through it.

Very quickly (at the most in a few ms), the electric arc no longer has enough current to sustain itself and is naturally extinguished (arc current 3*a*). All the current passes through the bypass circuit (arc current 3*b*) of lower impedance until the melting of the fuse F2 (see FIG. 6). The main power supply circuit coming from the motor is then isolated; the motor can continue to be driven and to develop a voltage across its terminals, but once the electric arc has been extinguished, it will not be able to reform since this main power supply circuit is then open.

FIG. 7 shows the appearance of the different currents in the electrical circuit according to the state of the contactor K3 in the case of a high-voltage DC power supply of 540V in a permanent-magnet electric motor of 30 kW to 4.5 MW in power.

The invention claimed is:

1. A device for protecting against a short-circuit occurring on a high-voltage DC power supply line between a DC source and an active load, wherein the DC source includes a first contactor and a first fuse, and the device comprising an electrical distribution unit disposed between the DC source and the active load, the electrical distribution unit including a second contactor, the device further comprising a bypass circuit formed of a third contactor and a second fuse connected in series and set up parallel to the active load via lines independent from a high voltage DC power supply line, the bypass circuit configured to pass most of the current through the bypass circuit until a melting of the second fuse, and wherein the second fuse is of low rating corresponding to an amperage of less than 32 A, and the active load is a permanent-magnet electric motor of 30 kV W to 4.5 MW in power.

2. The protection device as claimed in claim 1, wherein the independent line is of small cross-section.

3. The protection device as claimed in claim 2, wherein the small cross-section corresponds to a cross-section of less than 6 mm².

4. The protection device as claimed in claim 1, wherein the DC source is a battery.

5. The protection device as claimed in claim 4, wherein the third contactor and the second fuse are assembled in the electrical distribution unit disposed between the battery and the permanent-magnet electric motor.

6. An electrical distribution network including the protection device as claimed in claim 1.

7. An aircraft including the electrical distribution network as claimed in claim 6.

* * * * *